Feb. 16, 1954 A. B. SOWTER 2,669,138
DEVICE FOR COLD PRESSURE WELDING WIRES AND THE LIKE
Filed Aug. 15, 1952
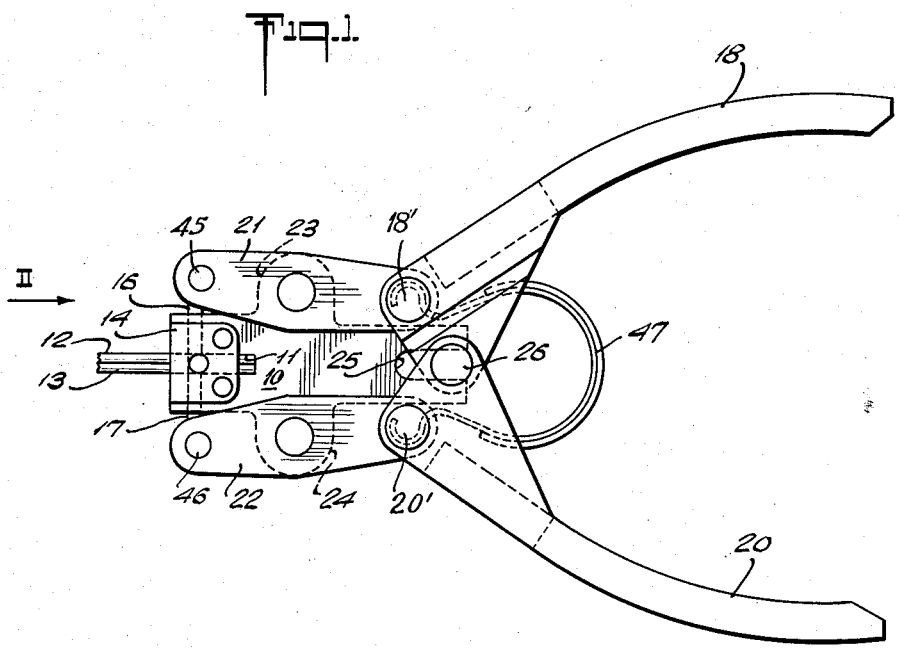
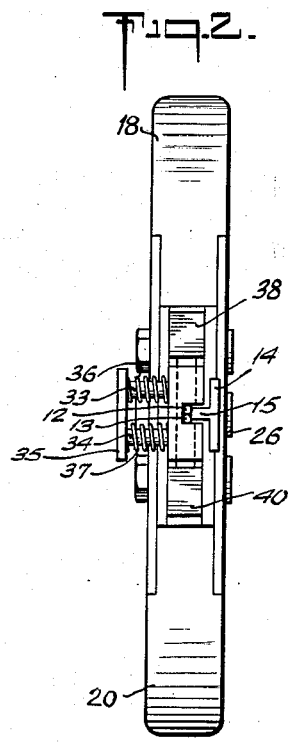
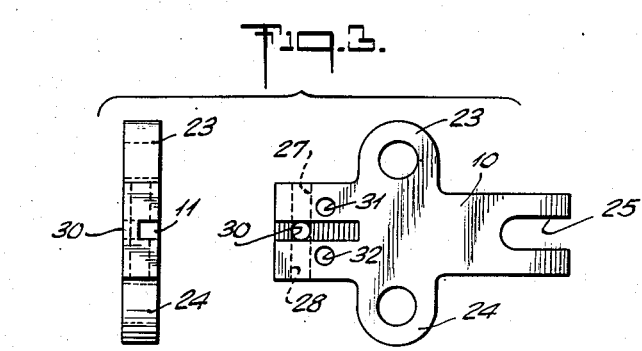
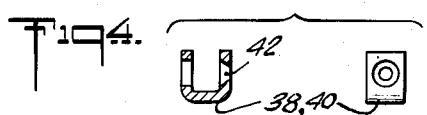
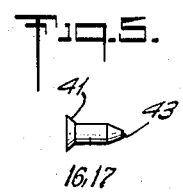
INVENTOR.
ANTHONY BAGNOLD SOWTER
BY
ATTORNEY Patented Feb. 16, 1954

2,669,138

UNITED STATES PATENT OFFICE 2,669,138

DEVICE FOR COLD PRESSURE WELDING WIRES AND THE LIKE

Anthony Bagnold Sowter, Ickenham, England, assignor to The General Electric Company Limited, London, England, a British company Application August 15, 1952, Serial No. 304,540

Claims priority, application Great Britain April 25, 1952

9 Claims. (Cl. 78—82)

The present invention relates to pressure welding, such as cold pressure welding, more particularly to the splicing or welding together by pressure a pair of rods, wires, or the like, especially electrical conductors of aluminum, copper, or other ductile and pressure weldable metal or metal alloy.

In my co-pending patent application Serial No. 274,098, filed February 29, 1952, entitled "Means For and Method of Making Cold Welded Wire Joints," there is described a method of pressure welding together a pair of electrical conductors of cold pressure weldable metal, according to which the conductors or wires are superposed or laid one on the other, or side by side in line, and a pair of aligned opposing welding tools, each having a circular pressure applying surface, are brought together to squeeze and weld the conductors between them by a solid-phase cold weld joint. In the said application, each of the two welding tools consists of a pin having a suitable pressure applying or welding surface and arranged to be operated or driven toward the other tool by a suitable pressure applying means.

An object of the present invention is the provision of a simple and efficient welding device of the above type for joining together, by cold pressure welding, a pair of wires, rods, or the like, consisting of cold pressure weldable metal.

Ancillary objects of the invention are the provision of a hand-operated pressure welding tool of the above type for joining electrical wires or conductors by cold welding which is both simple in design and easy to operate; which will not require skilled labor for its use and operation; and which will be of light-weight and suitable for use in the field, especially for splicing or joining telephone and other electrical wires or conductors in connection with the manufacture, installation or repair of electrical equipment of any type.

With the foregoing and further objects in view, as will appear hereafter, a hand welding or wire joining tool according to the invention comprises substantially a supporting block having a groove or slot arranged to receive a pair of wires or the like to be joined in superposed or side-by-side relationship, said groove or slot, or the means associated therewith, being arranged to hold the wires or the like closely together. For this purpose the tool further comprises releasable means for retaining or pressing the wires against the bottom of the slot and a pair of oppositely moving welding pins located and slidable in suitable bores of the block, said bores lying in line, one on each side of said groove, and the said line being arranged to be perpendicular to the wires or the like and in a plane containing the axes thereof. The tool also comprises means, such as a pair of hand-operated lever arms, for applying welding pressure to said pins, to drive the pins together and into the superposed wires to a predetermined distance and to effect welding of the wires or the like by a solid phase welding joint, in a manner described in greater detail in the above-mentioned co-pending application.

Preferably, the means for retaining the wires or the like in the groove in the supporting block comprises a bar parallel to the length of the wires and arranged to engage said groove and to bear with spring pressure against the sides of the superposed wires to be joined or welded.

The welding device may be fabricated in the form of a hand tool, the necessary pressure being applied to the welding pins by way of hand-operated levers, in the manner described in greater detail hereafter.

The invention will be better understood by reference to the following description of a practical hand tool for cold welding or splicing wires of aluminum, copper, or other ductile and pressure weldable metal, having a diameter of .060" or thereabouts, taken in conjunction with the accompanying drawing, forming part of this specification and wherein:

Figure 1 shows a side view of the tool;

Figure 2 shows an end view of the tool viewed in the direction of the arrow in Figure 1;

Figure 3 is a partial representation showing side and end views of the supporting block tool;

Figure 4 is another partial view showing side and end views of the retaining member for the welding pins; and Figure 5 shows a side view of a pressure applying pin.

Like reference numerals identify like parts in the several views of the drawings.

Referring to the drawing, more particularly to Figures 1 and 2 thereof, the cold welding hand tool shown comprises as its essential elements a supporting block 10 having a lateral groove or slot 11 in which the two wires 12 and 13 to be joined are arranged to be laid side by side in the manner shown, a spring-pressed plate 14 having a bar-like member 15 projecting at right angle therefrom and arranged to bear on the wires disposed in the groove 11, to retain or firmly press the wires against the bottom of the groove.

The tool furthermore comprises a pair of oppositely moving welding pins 16 and 17 sliding in bores of the block or member 10 and arranged to be forced together by a pair of handles or operating levers 18 and 20, to thereby weld the wires together, in the manner described in detail in the above mentioned application. The pins 16 and 17 are in turn carried or in engagement with the outer ends of two sets of lever arms or links 21 and 22 which are pivoted on the supporting block 10 and have their inner ends pivotedly connected, as at 18' and 20', to the inner ends of the handles 18 and 20 respectively.

Referring to Figure 3, it will be seen that the supporting block 10 is generally of rectangular cross section and is provided with two ears 23 and 24 projecting therefrom and which provide pivot points for the sets of levers or links 21 and 22. At the right-hand end of the block 10 in Figure 3, the block is provided with a guide slot 25 in which moves a bolt or pivot 26, coupled with the inner ends of both handles 18 and 20, engagement of the bolt 26 with the curved end of the slot 25 limiting the inward movement of the welding pins 16 and 17.

At the opposite end, the block 10 is provided as described above, with the groove or slot 11 to accommodate the wires 12 and 13, the depth of this slot being slightly greater than half the thickness of the block. Its length is sufficient to accommodate just about ½" of the ends of the wires to be welded together and its width should be equal to the combined diameter of the wires. Thus, if the wires are .064" diameter, then the width of the slot would be .128", the width being altered suitably for other gauges of wire.

The block 10 is furthermore provided with bores 27 and 28 serving as guides for the pins 16 and 17, the common diameter of said bores being such that the pins slide easily therein and the two bores 27 and 28 are in line with their common axis coinciding with the center plane of the block 10. The depth of the groove or slot 11 is such as to bring the center plane of the wires into the center plane of block 10 when the wires are placed and retained in the bottom of the groove by the retaining bar 15.

As will be further seen from Figure 3, the block 10 is provided with a recess, in the form of a through-hole 30, in the example shown, at the line of axis of the bores 27 and 28, to accommodate the outward or lateral flow of the metal at welding. Further through holes or bores 31 and 32 are provided in the block 10 for pins 33 and 34 associated with the retaining member of plate 14.

More specifically, the pins 33 and 34 are attached to the back of the member 14 on the one hand, and to a release plate 35 on the other side of the block 10, coil springs 36 and 37 encircling the pins 33 and 34 being provided between the block and the plate 35, to bias the member 14 into engagement with the wires or groove 11, to firmly urge the wires against the bottom of the groove. As a result, inward pressure on the plate 35 will cause the member 15 to move away from the wires and in order to allow for flow of metal and welding, the member 15 is furthermore provided with a hole or recess near the bores 27 and 28, corresponding to the hole 30 in the block 10.

Referring also to Figures 4 and 5, the welding pins 16 and 17 as shown in Figure 5 are supported and held captive in the tool by U-shaped resilient mounting members or stirrups 38 and 40, one of which is shown in Figure 4. More specifically, the tapering head 41 of a welding pin rests in a conical hole 42 of its associated stirrup 38 or 40, but can be withdrawn completely by movement in a direction to the left in the view according to Figure 4. This will enable different welding pins to be used or inserted for different sizes or gauges of wire, and as will be seen in Figure 5, the welding pin has a circular tapering welding tip 43 of a diameter suited to the diameter to be welded. Actually, the diameter of the welding surface of tip 43 is equal to the gauge or diameter of the wires being welded, as described in my above-mentioned co-pending application.

In order to apply pressure to the rear ends or heads of the welding pins 16 and 17, the links or levers 21 and 22 each carry a pressure-applying rod or cross pin 45 and 46, respectively, which engages or lies in the associated stirrup 38 or 40 and bears against the conical shaped head 41 of the associated welding pin 16 or 17. As a result, when the handles or operating arms 18 and 20 are pressed together, the cross pins 45 and 46 bear on the heads of the pins, whereby to drive the pins inwardly and, when the bolt 26 reaches the bottom of the slot 25 in the block 10, the surface of the welding tips 43 of the pins will be in the proper spacing position or welding distance from one another as described in my co-pending application. Upon release of the handles 18 and 19, the handles will open under the action of spring 47, the stirrups 38 and 40 restricting the welding pins from engagement with the wires in groove 11. The spring 47, in the example shown, is in the form of a circularly bent leaf spring having its opposite ends attached to the pivots 18' and 20' to normally urge the handles 18 and 20 into an outward or spread position, as shown in the drawing.

In operating the tool described above, the release plate 35 is depressed against the action of the springs 36 and 37, to move the retaining member or bar 15 out of the groove 11. The two wires 12 and 13 are then placed side by side in the groove and the retaining member allowed to return under the force of the springs, to retain or firmly urge the wires against the bottom of the groove. Subsequently, the handles 18 and 20 are forced together to drive the welding pins 16 and 17 through the bores 27 and 28 in the block 10, and into the superposed wires, to thereby weld the wires together by a solid phase cold weld bond. After welding, the retaining member 15 is again moved outwardly by depressing the release plate 35, this being preferably done with a slight rotational movement, to free the metal which has flown outwardly from the holes or recess in the block 10 and the retaining member 15.

In order to replace the set of welding tips or pins for another, all that is necessary is to free the parallel links or levers 21 and 22 from the handles 18 and 20, and to rotate the links in such a direction that the cross pins 45 and 46 move out of their associated stirrups 28 and 40 respectively. Once the rods are clear of the stirrups, the latter complete with the welding pins, can be removed for replacement or exchange of the pins.

In the foregoing description, the welding surface of the welding pins are described as of circular shape, but it will be understood that it is not essential or necessary that the pins should be so formed. Alternatively, they may be oval, rectangular, or any other suitable form or configuration, but should preferably be flat, although the edges may be slightly radiused.

It will be further understood that the wires 12 and 13 may be suitably cleaned prior to welding, such as by scratch brushing of the surfaces or portions to be joined or by the use of any other suitable cleaning method to remove the oxide coating or any other surface contaminants or matter foreign to the metal. It has been found, however, that in certain cases, cleaning can be dispensed with, in which cases, the welding pressure and lateral flow of the metal are sufficient to break up the oxide film, to allow of merging or welding of the adjoining metals into an efficient solid phase welding bond, in the manner described in my copending application above mentioned.

In the foregoing the invention has been described with reference to a specific illustrative device. It will be evident however, that numerous variations and modifications, as well as the substitution of equivalent parts or elements for those shown and described, may be made in accordance with the broader scope and spirit of the invention as defined by the appended claims. The specification and drawings are accordingly to be regarded in an illustrative rather than in a restrictive sense.

I claim:

1. A device for cold pressure welding wires and the like comprising a supporting block provided with a slot to accommodate a pair of wires to be joined arranged side by side and in close fitting engagement with said slot, releasable retaining means to firmly hold said wires against the bottom of said slot, a pair of oppositely moving pressure welding pins mounted in aligned bores of said block one on each side of said slot, the center line of said bores being perpendicular to said wires and coinciding with a plane containing the axes thereof, and means for applying welding pressure to drive said pins together to a predetermined distance.

2. A device for cold pressure welding wires and the like comprising a supporting block provided with a slot to accommodate a pair of wires to be joined arranged side by side in superposed and closely fitting engagement with said slot, a retaining bar engaging said slot, releasable resilient means to urge said bar against said wires, a pair of oppositely moving pressure welding pins slidable in aligned bores of said block one on each side of said slot, the center line of said holes being perpendicular to said wires and coinciding with a plane containing the axes thereof, and means for applying welding pressure to drive said pins together to a predetermined spacing distance.

3. A device for cold pressure welding wires and the like comprising a supporting block provided with a slot to accommodate a pair of wires to be joined arranged in superposed and closely fitting engagement with said slot, a spring-loaded releasable retainer having an extension bar engaging said slot to firmly urge said wires against the bottom of said slot, a pair of oppositely moving pressure welding pins slidable in aligned bores of said block one on each side of said block, the center line of said bores being perpendicular to said wires and coinciding with a plane containing the axes thereof, and means for applying welding pressure to said pins, to drive said pins together to a predetermined spacing distance.

4. A device for cold pressure welding wires and the like comprising a supporting block provided with a slot to accommodate a pair of wires to be joined arranged in superposed and closely fitting engagement with said slot, a retainer plate having a transverse bar engaging said slot and a pair of guide pins extending therefrom and passing through bores in said block, a release plate attached to the opposite ends of said pins, coil spring means encircling said pins between said release plate and block to normally urge said wires against the bottom of said slot by said bar, a pair of oppositely moving pressure welding pins mounted in aligned bores of said block one on each side of said slot, the center line of said bores being perpendicular to said wires and coinciding with a plane containing the axes thereof, and means for applying welding pressure to said pins to drive said pins together to a predetermined spacing distance.

5. A device for cold pressure welding wires and the like comprising a supporting block provided with a slot to accommodate a pair of wires to be joined arranged in superposed and closely fitting engagement with said slot, releasable retaining means to firmly urge said wires against the bottom of said slot, a pair of oppositely moving pressure welding pins slidable in aligned bores of said block one on each side of said slot, the center line of said bores being perpendicular to said wires and coinciding with a plane containing the axes thereof, a pair of links pivotally mounted on opposite sides of said block, corresponding ends of said links each bearing upon one of said welding pins, and pressure applying means to simultaneously operate the opposite ends of said links to a limit position, to thereby drive said pins together and into the superposed wires.

6. In the device as claimed in claim 5, including a U-shaped mounting member for each of said welding pins, said pins having heads removably mounted in one side of the associated mounted member and a cross-pin carried by said links engaging the adjacent mounting member and bearing upon the head of the associated welding pin.

7. A device for cold pressure welding wires and the like comprising a supporting block provided with a slot to accommodate a pair of wires to be joined arranged in superposed and closely fitting engagement with said slot, releasable retaining means to urge said wires against the bottom of said slot, a pair of oppositely moving pressure welding pins mounted in aligned bores of said block one on each side of said slot, the center line of said bores being perpendicular to said wires and coinciding with the plane containing the axes of said wires, a pair of links pivotally mounted on opposite sides of said block, corresponding ends of said links each bearing upon one of said welding pins, a pair of operating levers each pivotally connected to one of the remaining ends of said links and being connected together by a common pivot movable in a slot of said block, and resilient means to normally urge said handles apart.

8. A device as claimed in claim 7, comprising a U-shaped mounting member for each of said welding pins, said pins being provided with tapering heads removably mounted in one side of the associated mounting member, and cross-pins carried by said links and engaging the adjacent mounting members and bearing upon the head of the associated welding pins.

9. A device for cold pressure welding wires and the like comprising a supporting block provided with a slot to accommodate a pair of wires to be joined arranged in superposed and closely fitting engagement with said slot, releasable retaining means to urge said wires against the bottom of said slot, a pair of oppositely moving pressure welding pins sliding in aligned bores of said block one on each side of said slot, the center line of said bores being perpendicular to said wires and coinciding with a plane containing the axes thereof, and means for applying pressure to said pins to force said pins together and into the superposed wires, to thereby weld said wires by a solid phase welding bond, said retaining means and slot being provided with recesses adjacent to said bores to allow of lateral flow of the metal at welding.

ANTHONY BAGNOLD SOWTER.

References Cited in the file of this patent

UNITED STATES PATENTS

| Number | Name | Date |
|---|---|---|
| 415,836 | Francis | Nov. 26, 1889 |
| 804,045 | Rietzel | Nov. 7, 1905 |
| 1,153,391 | Hughes | Sept. 14, 1915 |
| 2,086,400 | Brenizer | July 6, 1937 |
| 2,359,083 | Carlson | Sept. 26, 1944 |
| 2,462,536 | Muter | Feb. 22, 1949 |